United States Patent
Mukerji et al.

(10) Patent No.: US 9,106,479 B1
(45) Date of Patent: *Aug. 11, 2015

(54) SYSTEM AND METHOD FOR MANAGING NETWORK COMMUNICATIONS

(75) Inventors: Arindum Mukerji, Seattle, WA (US); Jesse A. Rothstein, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 3149 days.

This patent is subject to a terminal disclaimer.

(21) Appl. No.: 10/721,565

(22) Filed: Nov. 25, 2003

Related U.S. Application Data

(60) Provisional application No. 60/486,628, filed on Jul. 10, 2003.

(51) Int. Cl.
*H04L 29/08* (2006.01)
*H04L 12/805* (2013.01)

(52) U.S. Cl.
CPC .... *H04L 29/08009* (2013.01); *H04L 29/08045* (2013.01); *H04L 29/08072* (2013.01); *H04L 47/36* (2013.01)

(58) Field of Classification Search
CPC ............. H04L 29/08; H04L 29/08072; H04L 29/08045; H04L 69/16; H04L 47/193; H04L 63/166
USPC ......................................... 709/237, 223, 227
See application file for complete search history.

(56) References Cited

U.S. PATENT DOCUMENTS

| | | | |
|---|---|---|---|
| 5,809,254 A * | 9/1998 | Matsuzono ................... 709/235 |
| 5,958,053 A | 9/1999 | Deneker |
| 6,091,737 A * | 7/2000 | Hong et al. ................... 370/431 |
| 6,249,868 B1 * | 6/2001 | Sherman et al. .............. 713/168 |
| 6,298,445 B1 | 10/2001 | Shostack et al. |
| 6,341,129 B1 * | 1/2002 | Schroeder et al. ............ 370/354 |
| 6,400,729 B1 * | 6/2002 | Shimadoi et al. ............. 370/466 |
| 6,434,620 B1 * | 8/2002 | Boucher et al. ............... 709/230 |
| 6,487,666 B1 | 11/2002 | Shanklin et al. |
| 6,563,821 B1 * | 5/2003 | Hong et al. ................... 370/389 |
| 6,643,259 B1 * | 11/2003 | Borella et al. ................ 370/231 |
| 6,674,722 B1 * | 1/2004 | Tiainen et al. ................ 370/236 |
| 6,714,985 B1 * | 3/2004 | Malagrino et al. ........... 709/236 |
| 6,721,798 B1 * | 4/2004 | Kubista ........................ 709/236 |
| 6,772,334 B1 | 8/2004 | Glawitsch |

(Continued)

OTHER PUBLICATIONS

Wikipedia, OSI model, pp. 1-13.*

(Continued)

*Primary Examiner* — Backhean Tiv
(74) *Attorney, Agent, or Firm* — John W. Branch; Lowe Graham Jones PLLC

(57) ABSTRACT

A system and method is directed to managing network communications and improving network security. In a communication protocol, an improved method of generating a value that encodes information received in an incoming message, and a corresponding way of validating an incoming message with an encoded value, improves network security. A technique for directing a network device to delay communications includes sending an instruction designating an initial window size of zero to the device. Another technique uses a TCP fast retransmit protocol. The techniques can be used to provide layer four switching, change to layer seven switching when desired, and then change back to layer four switching to improve security in a layer four switching device. Levels of trust can also be used to selectively perform aspects of the invention.

6 Claims, 14 Drawing Sheets

(56) References Cited

U.S. PATENT DOCUMENTS

| | | | |
|---|---|---|---|
| 6,816,910 B1* | 11/2004 | Ricciulli | 709/237 |
| 7,032,037 B2* | 4/2006 | Garnett et al. | 710/2 |
| 7,088,735 B1* | 8/2006 | Reohr et al. | 370/466 |
| 7,206,283 B2* | 4/2007 | Chang et al. | 370/230 |
| 7,254,133 B2* | 8/2007 | Govindarajan et al. | 370/394 |
| 7,275,093 B1* | 9/2007 | Freed et al. | 709/223 |
| 7,298,746 B1* | 11/2007 | De La Iglesia et al. | 370/394 |
| 7,366,096 B2* | 4/2008 | Swami | 370/231 |
| 7,430,755 B1* | 9/2008 | Hughes et al. | 726/3 |
| 7,483,990 B2* | 1/2009 | Baratakke et al. | 709/227 |
| 7,490,162 B1* | 2/2009 | Masters | 709/238 |
| 7,774,484 B1* | 8/2010 | Masters et al. | 709/229 |
| 2001/0042200 A1* | 11/2001 | Lamberton et al. | 713/151 |
| 2002/0031134 A1 | 3/2002 | Poletto et al. | |
| 2002/0035636 A1* | 3/2002 | Gitsels et al. | 709/230 |
| 2002/0035681 A1* | 3/2002 | Maturana et al. | 713/151 |
| 2002/0055983 A1* | 5/2002 | Goddard | 709/217 |
| 2002/0095492 A1 | 7/2002 | Kaashoek et al. | |
| 2002/0101819 A1 | 8/2002 | Goldstone | |
| 2002/0138643 A1 | 9/2002 | Shin et al. | |
| 2002/0141448 A1* | 10/2002 | Matsunaga | 370/469 |
| 2002/0194342 A1* | 12/2002 | Lu et al. | 709/227 |
| 2002/0194350 A1* | 12/2002 | Lu et al. | 709/229 |
| 2003/0016819 A1* | 1/2003 | Cheng | 380/2 |
| 2003/0035370 A1 | 2/2003 | Brustoloni | |
| 2003/0043788 A1* | 3/2003 | Hasegawa et al. | 370/352 |
| 2003/0046394 A1* | 3/2003 | Goddard et al. | 709/226 |
| 2003/0110286 A1* | 6/2003 | Antal et al. | 709/236 |
| 2003/0165160 A1* | 9/2003 | Minami et al. | 370/466 |
| 2003/0177154 A1* | 9/2003 | Vrancic | 708/160 |
| 2004/0062267 A1* | 4/2004 | Minami et al. | 370/463 |
| 2004/0111635 A1* | 6/2004 | Boivie et al. | 713/201 |
| 2004/0165538 A1* | 8/2004 | Swami | 370/252 |
| 2004/0165588 A1* | 8/2004 | Pandya | 370/389 |
| 2005/0165966 A1* | 7/2005 | Gai et al. | 709/249 |
| 2005/0210243 A1* | 9/2005 | Archard et al. | 713/160 |
| 2007/0005777 A1* | 1/2007 | Fremantle et al. | 709/228 |
| 2007/0206634 A1* | 9/2007 | Lotter et al. | 370/469 |
| 2007/0253430 A1* | 11/2007 | Minami et al. | 370/395.52 |
| 2008/0104390 A1* | 5/2008 | VanHeyningen et al. | 713/151 |

OTHER PUBLICATIONS

Wikipedia, Transport Layer, pp. 1-5.*
Bell Laboratories, "Layer 4/7 Switching and Other Custom IP Traffic Processing using the NEPPI API," Bell Laboratories, Lucent Technologies, Mar. 1, 2000, 11 pages, http://www.bell-labs.com/project/webswitch/Gryph_im/APAHBFEK.pdf.
Bernstein, D.J., "Syncookies 1996.txt (SYN Flooding [info])," Sep. 16, 1996, 1 page, http://cr.yp.to/syncookies/idea.
Bernstein, D.J., "Syncookies discussion 1996.txt," Sep. 25, 1996, 17 pages, http://cr.yp.to/syncookies/archive.
Bernstein, D.J., "SYN cookies," Jan. 31, 2002, 3 pages, http://cr.yp.to/syncookies.html.
EventHelix.com, "TCP—Transmission Control Protocol (TCP Fast Retransmit and Recovery)," TCP/IP Sequence Diagrams, Mar. 28, 2002, 6 pages, EventHelix.com, Gaithersburg, http://www.eventhelix.com/RealtimeMantra/Networking/TCP_Fast_Retransmit_and_Recovery.pdf.
Google Cache, "SYN Cookies," http://liquifried.com/docs/security/scookies.html, May 13, 2003, 2 pages, http://www.google.com/search?q=cache:c7bbJFZR9q0C:www.liquifried.com/docs/security/scookies.html+%22syn+&hl=en&ie=UTF-8.
Karig, David, Lee, Ruby, "Remote Denial of Service Attacks and Countermeasures," Princeton University Department of Electrical Engineering Technical Report CE-L2001-002, Oct. 2001, 17 pages, Princeton University, Princeton.
Lemon, Jonathan, "SYN Cookies," USENIX.com, Dec. 4, 2001, 3 pages, http://www.usenix.org/publications/library/proceedings/bsdcon02/full_papers/lemon/lemon_html/node9.html.
Peng, Tao, Leckie, Christopher, Ramamohanarao, Kotagiri, "Detecting distributed denial of service attacks using source IP address monitoring," 14 pages, Nov. 2002, Department of Electrical and Electronic Engineering, Melbourne, Victoria, http://www.ee.mu.oz.au/_pgrad/taop/research/detection.pdf.
Snooeren, Alex C., Partridge, Craig, Sanchez, Luis A., Jones, Christine E., Tchakountio, Fabrice, Schwartz, Beverly, Kent, Stephen T., Strayer, W. Timothy, "Hash-Based IP Traceback", IEEE/ACM Transactions on Networking (ToN), Dec. 2002, 12 pages, vol. 10, No. 6, http://citeseer.ist.psu.edu/peng02detecting.html.
Stevens, W., "TCP Slow Start, Congestion Avoidance, Fast Retransmit, and Fast Recovery Algorithms," Jan. 1997, 6 pages, Network Working Group, NAO.
Wang, Haining, Zhang, Danlu, and Shin, Kang, G., "Detecting SYN Flooding Attacks," EECS Department, The University of Michigan, 2002, 10 pages, www.cs.wm.edu/~hnw/paper/attack.pdf.
Welch, Von., "A User's Guide to TCP Windows," National Center for Supercomputing Applications, Jun. 19, 1996, http://www.ncsa.uiuc.edu/People/vwelch/net_perf/tcp_windows.html.
Dougles E. Comer and John C. Lin, "Probing TCP Implementations," USENIX Summer 1994 Conference, pp. 1-11.

* cited by examiner

SYSTEM AND METHOD FOR MANAGING NETWORK COMMUNICATIONS

RELATED APPLICATION

This application is a Utility Patent application based on a previously filed U.S. Provisional Patent application, U.S. Ser. No. 60/486,628 filed on Jul. 10, 2003, the benefit of the filing date of which is hereby claimed under 35 U.S.C. §119(e).

FIELD OF THE INVENTION

The present invention relates to computer networks and, more particularly, to a system and method for improving network security.

BACKGROUND OF THE INVENTION

Much of the traffic on the Internet uses the Transmission Control Protocol (TCP). TCP is considered to be layer four, or the transport layer, of a seven-layer protocol stack as defined by the ISO-OSI (International Standards Organization-Open Systems Interconnection) framework. Layer seven is referred to as the application layer of the protocol stack. TCP is specified in RFC 793, available at http://www.faqs.org/rfcs/rfc793.html. RFC 879, available at http://www.faqs.org/rfcs/rfc879.html, discusses the maximum segment size, an optional feature within TCP that allows a data receiver to specify the maximum size TCP segment that can be accepted on a connection.

The TCP protocol includes a handshake to establish a connection between a client and a server. The server receives an initial packet, called a synchronization (SYN) packet from the client. The server responds by sending the client a SYN-ACK packet. The client then responds by sending the server an acknowledgment (ACK) packet. In response to receiving the SYN-ACK packet, the server may devote resources to the potential connection. If the server doesn't receive an ACK packet from the client, the devoted resources may not be utilized, and might be unavailable to other connections. If one or more clients send numerous SYN packets to a server, the server's resources may be exhausted, and it is at least temporarily unavailable for additional connections from clients. The process of sending numerous SYN packets to a server without completing the connections is known as SYN flooding.

FIG. 3 illustrates a basic TCP handshake between a TCP client 303 and a TCP server 306. The TCP client initiates a handshake by sending a SYN packet 308 to the TCP server 306. The TCP server can be a server such as servers 112-116 of FIG. 1, a server array controller such as server array controller 110 of FIG. 1, or another network device. The SYN packet includes a client initial sequence number (CISN). The CISN is typically a random or pseudo-random number generated by the TCP client.

In response to receiving the SYN packet, the TCP server 306 sends a SYN-ACK packet 310 to the TCP client 303. The SYN-ACK packet includes a server initial sequence number (SISN) and the sequence number of the next packet expected from the client. This number is typically the CISN number plus one. The SISN number is typically a random or pseudo-random number. The TCP server also typically uses some memory to record the CISN and the SISN, and may reserve memory for the expected TCP connection.

In response to receiving the SYN-ACK packet 310 from the TCP server 306, the TCP client 303 sends to the TCP server an ACK packet 312. The ACK packet 312 includes the sequence number of the next packet expected from the TCP server. This number is typically the SISN number plus one.

When a SYN flood occurs, the TCP server 306 receives numerous SYN packets, and does not receive corresponding ACK packets. This results in a substantial amount of memory that is allocated by the TCP server, and may result in a decreased ability or an inability to establish additional TCP connections or to perform other functions of the TCP server.

TCP cookies were developed as a defense to TCP flooding. In the TCP cookie technique, in response to receiving a SYN packet, a TCP server generates an SISN that is a function of the CISN received in the SYN packet, the TCP client's IP address, and a secret value. When the TCP server receives a corresponding ACK packet 312 from the TCP client 303, it is able to determine the validity of the ACK packet by calculating a function based on values in the ACK packet 312, and comparing the result with the incoming acknowledgment number. If the values match, the TCP server knows that a valid TCP handshake has been performed, and can allocate resources at that time, instead of allocating the resources in response to the SYN packet 308. A discussion of SYN cookies can be found in a paper by Dan Bernstein, available at http://cr.yp.to/syncookies.html.

Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise.

The phrase "in one embodiment" as used herein does not necessarily refer to the same embodiment, though it may.

As used herein, the term "or" is an inclusive "or" operator, and is equivalent to the term "and/or", unless the context clearly dictates otherwise.

The term "based on" is not exclusive and allows for being based on additional factors not described, unless the context clearly dictates otherwise.

Throughout the specification, the meaning of "a," "an," and "the" include plural references. The meaning of "in" includes "in" and "on."

Briefly stated, the present invention is directed to a system, apparatus, and method for improving security in a network device that performs a communications protocol with another network device.

Figure 1:
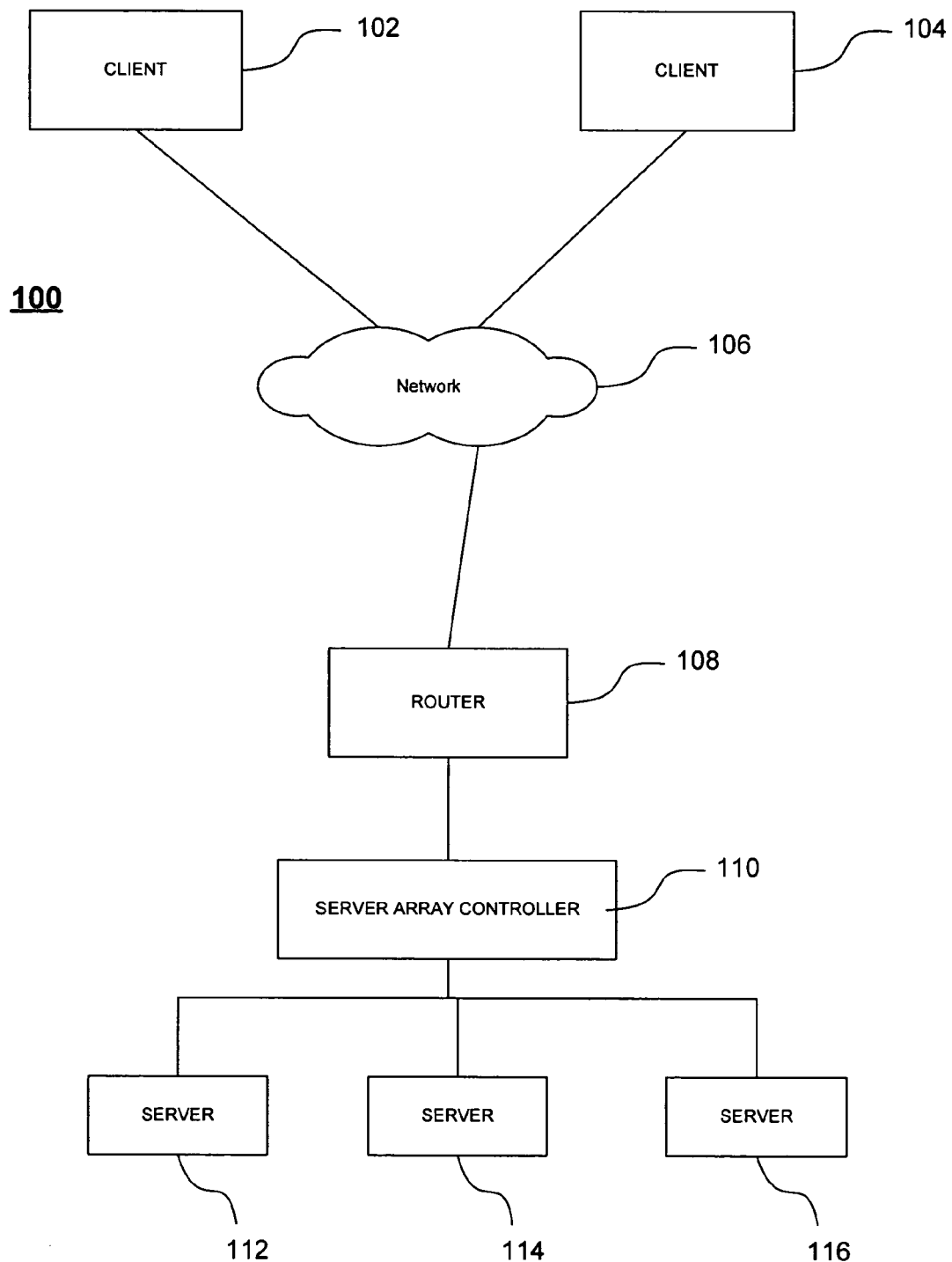
FIG. 1 is a system diagram of a computer network in which the invention may be practiced.

FIG. 1 illustrates an exemplary environment 100 in which the invention operates, according to one embodiment of the invention. The environment 100 includes a network 106. The network 106 can be a wide area network (WAN), a local area network (LAN), or a combination of interconnected WANs and LANs. The Internet is made up of a vast number of such interconnected networks, computers, and network devices that use the Transmission Control Protocol/Internet Protocol ("TCP/IP") suite of protocols to communicate with one another. The environment further includes client devices 102-104 (also referred to as clients), router 108, server array controller (SAC) 110, and a server array. The server array includes servers 112-116. The invention can be practiced in an environment with one server or numerous servers. Network 106 couples clients 102-104 to the server array controller 110 through the router 108. Server array controller 110 couples the server array to network 106 through the router 108. An exemplary server array controller that can connect with network 106 is network device 200 of FIG. 2. A router 108 is an intermediary device on a communications network that expedites packet delivery.

Clients 102-104 are computing devices capable of connecting with network 106. The set of such devices can include devices that connect using one or more wired communications mediums, a wireless communications medium, or a combination of wired and wireless communications mediums. Clients 102-104 include such devices as personal computers, multiprocessor systems, microprocessor-based or programmable consumer electronics, network PCs, cell phones, smart phones, pagers, PDAs, Pocket PCs, wearable computers, walkie talkies, radio frequency (RF) devices, infrared (IR) devices, CBs, integrated devices combining one or more of the preceding devices, and the like.

Servers 112-116 are computing devices that provide information and/or services to clients 102-104. Servers 112-116 can, for example, store web pages or components thereof, dynamically create web pages or components thereof, store data and/or files for access by other servers or clients, or any combination of these functions.

In general, clients 102-104 are sites where a human user operates the computing device to make requests for data or services from other computers on the network, though a client can be automated and not require a human user. Often, the requested data resides in computing devices such as servers 112-116. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

Server array controller 110 receives packets from network 106, through the router 108, and also receives packets from the servers 112-116. In some configurations, server array controller 110 acts like a layer 7 switch. That is, it may look at content associated with layers 5 through 7 of the packet, e.g. a request for an HTML page, the request including a Uniform Resource Locator (URL) and information that identifies the user, such as a cookie, etc. It can store information in memory so that the next time the requestor requests more information from the same web site each request is sent to the same server. A server array controller 110 can do this, in part, to ensure that the user is connected to the server that the user previously connected to. This helps prevent the loss of transaction data, such as items in an electronic shopping cart. A layer 7 switch may facilitate a communication between a client and a server by terminating a client-side TCP connection with the client, terminating a server-side TCP connection with the server, and using both connections to receive, process, and forward data between the client and the server.

In some configurations, server array controller 110 performs as a layer 4 switch. That is, it receives a packet, such as a TCP packet, from one of the clients 102-104, minimally processes the packet, and forwards the packet to one of the servers 112-116 based on transport layer information. As a layer 4 switch, the server array controller 110 does not terminate TCP connections with either the client or the server. Instead, a server 112-116 performs a TCP handshake with a client 102-104, and the server array controller serves as an intermediate network device, forwarding packets between the client and the server. As a layer 4 switch, the server array controller may make filtering and switching decisions based on layer 4 data within a packet, such as an IP address. It may also modify source or destination addresses on TCP packets prior to forwarding them, a process known as network address translation (NAT). The BIG-IP® family of traffic managers, by F5 Networks of Seattle, Wash., are examples of traffic managers that perform layer 4 switching or layer 7 switching.

Figure 2:
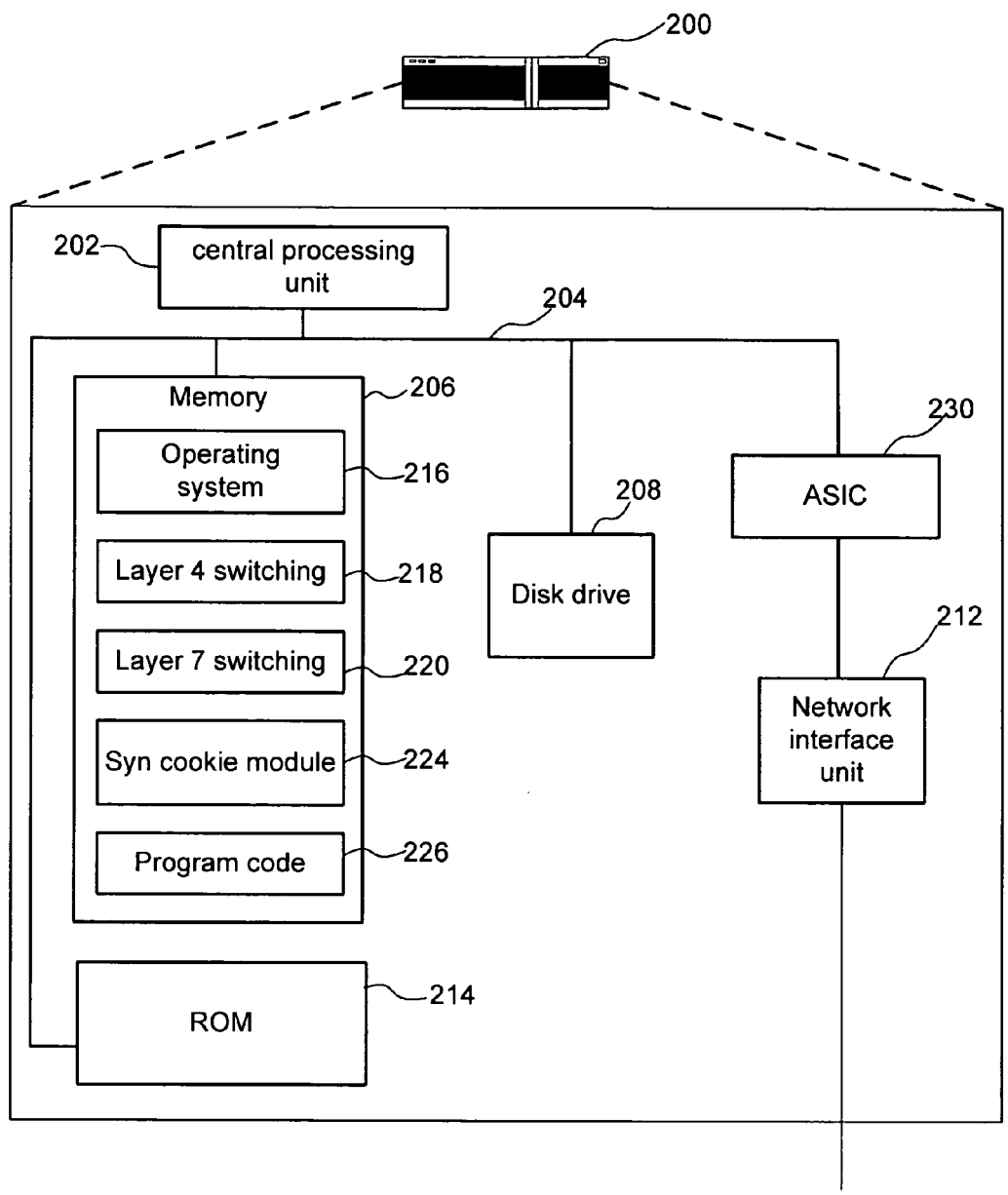
FIG. 2 is a block diagram of an exemplary network device that may be employed to perform the invention.
Figure 3:
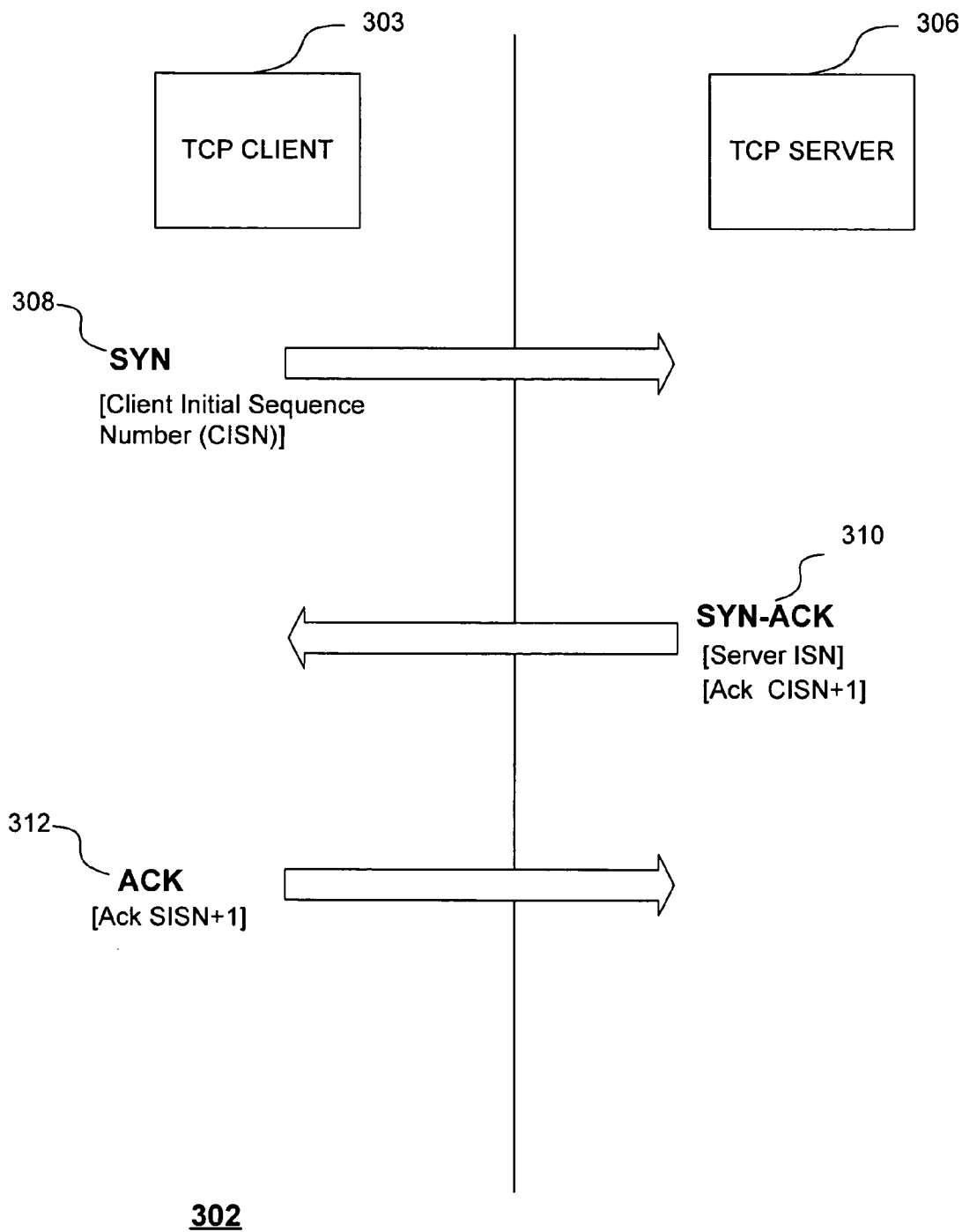
FIG. 3 illustrates a TCP client—TCP server message flow, in accordance with a TCP protocol.

FIG. 2 shows an exemplary network device 200 that can operate as a server array controller in accordance with the present invention. It will be appreciated that not all components of network device 200 are illustrated, and that network device 200 can include more or fewer components than those shown in FIG. 2. Network device 200 can operate, for example, as a router, bridge, firewall, gateway, traffic management device (also referred to as a traffic manager), distributor, load balancer, server array controller, or proxy server. It is to be noted that these functions are not necessarily distinct from each other. For example, a traffic manager may perform load balancing and control an array of servers. The communications can take place over network 106 (FIG. 1), or some other communications network known to those skilled in the art.

As illustrated in FIG. 2, network device 200 includes a central processing unit (CPU) 202, mass memory, and a network interface unit 212 connected via a bus 204. Network interface unit 212 includes the necessary circuitry for connecting network device 200 to network 106, and is constructed for use with various communication protocols, including the TCP/IP protocol. Network interface unit 212 can include or interface with circuitry and components for transmitting messages and data over a wired and/or wireless communications medium.

The mass memory generally includes random access memory ("RAM") 206, read-only memory ("ROM") 214, and one or more permanent mass storage devices, such as hard disk drive 208. The mass memory stores operating system 216 for controlling the operation of network device 200. The operating system 216 may comprise an operating system such as UNIX®, LINUX®, or Windows®.

In one embodiment, the mass memory stores program code for performing layer 4 switching 218, and program code for performing layer 7 switching 220, in accordance with the present invention. The mass memory may also store program code for implementing a Syn cookie module 224, in accordance with the present invention. The mass memory can also store additional program code 226 and data for performing the functions of network device 200. The layer 7 switching module 220, the Syn cookie module 224, and the layer 4 switching module 218 can include data for performing their respective functions, or the data can be stored separately in the memory 206 or in another storage location.

In one embodiment, the network device 200 includes one or more Application Specific Integrated Circuit (ASIC) chips 230 connected to the bus 204. The ASIC chip 230 includes logic that performs some of the functions of network device 200. For example, in one embodiment, the ASIC chip 230 performs a number of packet processing functions, to process incoming packets in cooperation with the layer 4 switching module 218 or the layer 7 switching module 220. In one embodiment, the logic of the Syn cookie module 224 is at least partly performed by the ASIC chip 230. In one embodiment, the network device 200 includes one or more field-programmable gate arrays (FPGA) (not shown), instead of, or in addition to, the ASIC chip 230. A number of functions of the network device can be performed by the ASIC chip 230, by an FPGA, by the CPU 202 with the logic of program code stored in mass memory, or by any combination of the ASIC chip, the FPGA, and the CPU.

Computer storage media can include volatile and nonvolatile, removable and non-removable media implemented in any method or technology for storage of information, such as computer readable instructions, data structures, program modules or other data. Examples of computer storage media include RAM 206, ROM 214, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Network device 200 can also include an input/output interface (not shown) for communicating with external devices or users.

Network device 200 can be implemented as one or more "blades" where the term "blade" refers to one of multiple electronic circuit boards or cards that are installed in a hardware chassis with a backplane. An exemplary blade can include one or more processors, volatile and non-volatile memory, interfaces suitable for communicating information to and from the blade, and other components for enabling the operation of one or more applications. A blade can also include a specialized interface for the backplane and other interfaces, such as a USB port, FIREWIRE port, serial port, RF interface, IR interface, Ethernet interface, IDE controller, and the like. An application running on a blade can employ any of these interfaces to communicate information to other applications running on other blades and/or devices coupled to the blade server. Network device 200 can also be implemented as a combination of blades and additional components in chassis.

The server array controller 110 (hereinafter referred to simply as a "controller") shown in FIG. 1 typically includes one or more network interfaces, and performs one or more of the operations of routing, translating, and switching packets. A controller having a single network connection is also within the scope of the present invention.

In one example of the invention, the controller is a load-balancing server array controller. In this example, the controller includes load-balancing and control logic that can be implemented in software, hardware, or a combination of software and hardware.

In one embodiment, the server array controller 110 intelligently distributes web site connections across the server array. The controller 110 can manage connections to one or multiple Internet or intranet sites, and it can support a wide variety of Internet protocols and services such as TCP/IP (transmission control protocol/Internet protocol) and HTTP. Additionally, the controller 110 can support any one or more of a suite of communications protocols that are used to connect nodes on the Internet, including HTTP, file transfer (FTP), secure sockets layer (SSL), streaming media, DNS, UDP/IP, and email (SMTP).

Figure 4:
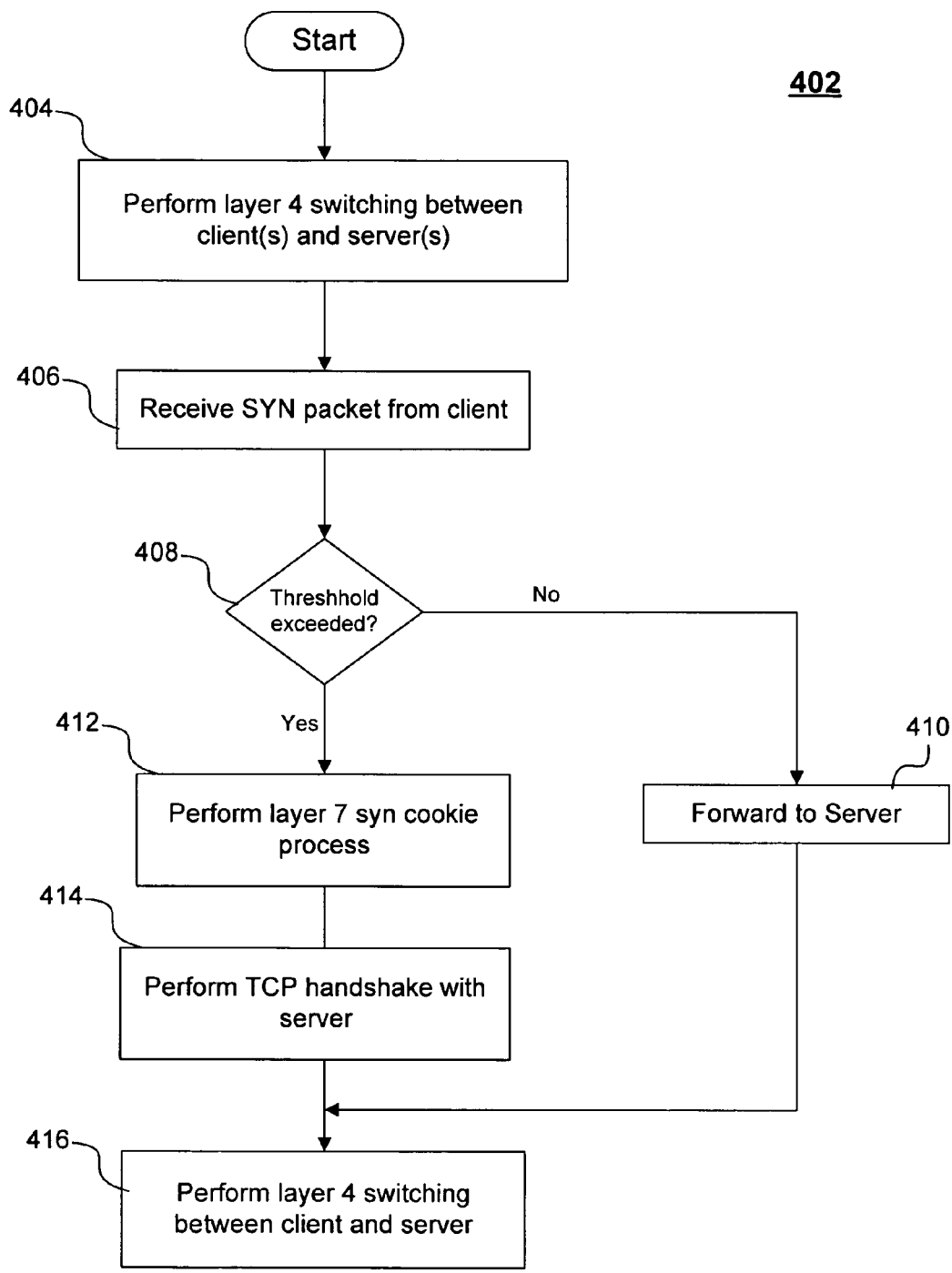
FIG. 4 is a flow chart illustrating a process for performing packet communications, in accordance with an embodiment of the present invention.

FIG. 4 illustrates a process 402 for performing packet communications, in accordance with an embodiment of the invention. In one embodiment, the process 402 is performed in a network device such as network device 200 and/or server array controller 110 of FIG. 1.

As illustrated in FIG. 4, after starting the process, at a block 404 the process performs layer 4 switching between one or more clients, such as clients 102-104 of FIG. 1, and one or more servers, such as servers 112-116 of FIG. 1. In one embodiment incoming packets are forwarded from the client to the server without buffering. In one embodiment, at least some of the packets are buffered prior to forwarding to the server.

At a block 406, a communications protocol synchronization packet, such as a TCP SYN packet, is received from the client. The SYN packet is used to indicate an initiation of a new communications connection. For example, a SYN packet received from a client may be a request to perform a TCP handshake between the client and a server, in order to establish a TCP connection.

At a decision block 408, the process makes a determination of whether a threshold has been exceeded. The threshold can be a designated amount of a resource, such as available memory, processor cycles, bandwidth, number of active connections, or a combination of such resources. The threshold can be a preconfigured quantity, or it can be dynamically determined based on one or more environmental factors. In one embodiment, a local threshold and a global threshold are used. The local threshold refers to a specific traffic management device, such as SAC 110. The global threshold refers to a system of devices or a LAN. Specifically, it refers to the total of all connections through every SAC in the system. At the decision block 408, the process uses the lower of the two thresholds in making the determination.

In one embodiment, one or more servers sends a signal to the SAC 110 to indicate that a threshold has been or is close to being exceeded, and another signal to indicate when a resource usage has dropped below the threshold. A signal can be encoded in packets passed to the SAC, or sent using an API, such as the iControl network API, available from F5 Networks, of Seattle, Wash.

If, at the decision block 408, it is determined that the threshold has not been exceeded, flow proceeds to a block 410, where the SYN packet is forwarded to a server. Prior to forwarding the packet, the packet might be modified, such as is done with network address translation. After forwarding the packet at the block 410, flow proceeds to a block 416, where layer 4 switching between the client and the server is performed. This layer 4 switching may include receiving and forwarding additional packets of the connection initiation handshake protocol, data packets, or a connection termination handshake protocol.

If, at the decision block 408, it is determined that a threshold has been exceeded, flow proceeds to the block 412, where a layer 7 Syn cookie process is performed. Details of this process are described below. After performing the layer 7 processing, flow proceeds to the block 414, where a TCP handshake is performed with the server. Flow then proceeds to the block 416, where layer 4 switching is performed between the client and the server. As described above, the layer 4 switching may include receiving and forwarding additional packets of the connection initiation handshake protocol, data packets, or a connection termination handshake protocol. In one embodiment (not shown), instead of performing the actions of block 416, after performing the TCP handshakes with the client and with the server (as illustrated by packets 504-514 of FIG. 5), the SAC (FIG. 1) performs layer 7 switching between the client and the server for the duration of the current communications connection.

Generally, layer 4 switching is faster than layer 7 processing, and allows for a higher throughput of packets. By beginning the process 402 performing layer 4 switching, and performing layer 7 processing only for a subset of the packet switching, there is a positive effect on speed and throughput. More specifically, by using layer 7 processing to perform a TCP connection initiation, and using layer 4 switching to forward other packets, performance is improved. Still more specifically, by changing to layer 7 processing to perform a TCP connection initiation handshake when a threshold is exceeded and using layer 4 switching at other times, performance is improved.

In one embodiment, a significant amount of the layer 4 switching is performed by employing a special purpose processor, such as ASIC 230 (FIG. 2) or an FPGA. Use of a special purpose processor allows for faster processing, and therefore higher throughput of packets. Thus the performance improvements of combining layer 4 switching and layer 7 processing is further enhanced by the use of such special purpose processors.

In one embodiment, the determination at block 408 is based on whether a signal has been received from one or more servers indicating that the layer 7 Syn cookie process is to be performed. In this embodiment, the SAC does not directly determine that a threshold has been reached, but makes a determination based on one or more received signals. The servers can send these signal when a threshold has been reached, or when it has determined, for another reason, that it is desirable to perform the layer 7 Syn cookie process. The server can send another signal to indicate that the SAC is to stop performing the layer Syn cookie process. The SAC can also receive one or more signals from one or more other network devices that determine there is a need to begin the Syn cookie process, and make the determination at block 408 on these signals. The other network devices can be on the same LAN as the SAC, or they can be devices remotely located.

Figure 5:
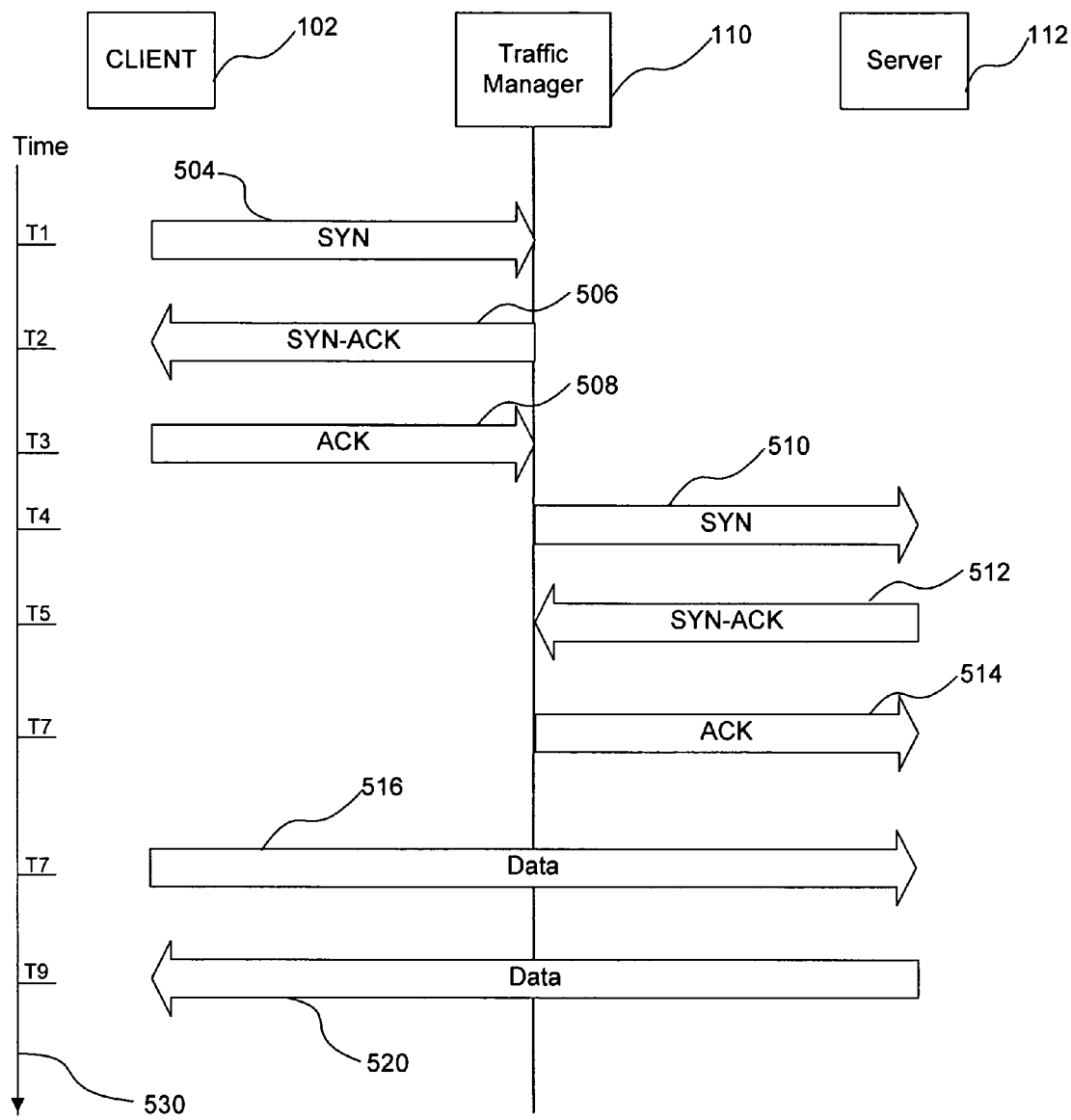
FIG. 5 illustrates a message flow combining layer 4 switching and layer 7 switching, in accordance with an embodiment of the present invention.

FIG. 5 illustrates a message flow combining layer 4 switching and layer 7 switching, and is discussed with reference to FIG. 4. FIG. 5 illustrates a communication between a client, such as client 102 of FIG. 1, and a server, such as server 112, employing an intermediate network device, such as server array controller 110. The flow of packets is illustrated with a timeline 530, to show the sequence of events, though the units of time are not to scale and may vary.

As illustrated in FIG. 5, the client 102 initiates a TCP handshake by transmitting a SYN packet 504. The server array controller (SAC) 110 receives the SYN packet, as discussed at block 406 of FIG. 4. In response, the SAC sends to the client a SYN-ACK packet 506. The client then responds by sending an ACK packet 508. In response to receiving the ACK packet 508, the SAC performs a validation of the received ACK packet. This exchange corresponds to the layer 7 syn cookie process of block 412.

The validation of the received ACK packet is illustrated in FIG. 9, and described below. If the SAC 110 determines that the ACK packet 508 is invalid, it "drops" the packet, and does not proceed with the remaining message flow illustrated in FIG. 5. This may happen as a result of a malicious or improperly executing client sending an unauthorized ACK packet 508. It may also happen if an ACK packet has been excessively delayed beyond a window allowed by the process as described.

If the SAC determines that the ACK packet 508 is valid, it continues as follows. As illustrated in FIG. 5, the SAC sends a SYN packet 510 to the server. The server responds by sending a SYN-ACK packet 512. The SAC then responds by sending an ACK packet 514 to the server.

At this point, the SAC 110 has established a TCP connection as a TCP server with the client 102, and it has established a TCP connection as a TCP client with the server 112. The SAC changes to layer 4 switching between the client 102 and the server 112. When the client 102 sends a data packet 516, the SAC receives the data packet and forwards it to the server 112. When the server sends a data packet 520, the SAC receives and forwards this data packet to the client. Typically, the layer 4 switching includes receiving and forwarding a number of data packets between the client and the server. Though not shown, the client and the server perform a TCP handshake to terminate the connection. The SAC forwards each packet of the termination handshake, as part of the layer 4 switching.

The SYN-ACK packet 506 includes a server initial sequence number (SISN) and the sequence number of the next packet expected from the client. According to the TCP protocol, the sequence number of the next packet expected from the client is the value of the CISN from the SYN packet 504 plus one. The SISN number is typically a random or pseudo-random number. For simplicity, as used herein, the term random number includes pseudo-random numbers, and the term random includes selection of values using a predictive or partly predictive algorithm. The use of a random SISN helps to prevent a client from using an SISN value received from one handshake in a different handshake. Thus, when a TCP server receives, in an ACK packet from a client, a SISN value that is valid for a handshake, the TCP server knows that the ACK packet is valid for that handshake.

To assist in the discussion of determining an SISN value, a brief explanation of a maximum segment size (MSS) is provided. TCP provides an option that may be used at the time a connection is established to indicate the maximum size TCP segment that can be accepted on that connection. This Maximum Segment Size (MSS) announcement is sent from the data receiver to the data sender and specifies the maximum segment size that the receiver can receive. An MSS is sent from a TCP client in the SYN packet 504, to inform the TCP server of the client's desired MSS. In order to preserve the MSS value received in a SYN packet, the TCP server maintains a table of selected values for the MSS, referred to as the MSS table. The values can be selected based on providing a range of commonly used MSS values. When a SYN packet is received, the TCP server determines the largest value in the MSS table that does not exceed the actual MSS value from the SYN packet. The index of this table entry is used by the TCP server to represent the MSS table value, which substitutes for the actual MSS value. An MSS index value of 3 bits, corresponding to an MSS table having eight entries, is commonly used.

In accordance with one aspect of the present invention, a TCP server, such as the SAC 110 of FIG. 1, determines an SISN value in the following way, as illustrated in the process 602 of FIG. 6. After a start block, the process, at a block 604, computes a first hash value that is based on fields extracted from the received SYN packet 504. In one embodiment, the fields used are the source IP address, the source port number, the destination IP address, the destination port, and the value CISN+1. The hash algorithm used to compute the hash value can be one of a number of hash algorithms, such as MD5 or SHA-1.

At a block 606, the process 602 retrieves a current random number from a table of random numbers. The process also retrieves a current MSS mapping. The MSS mapping is used to "hide" an MSS index in the SISN that is constructed. An MSS mapping is a value or mapping that indicates the positions within the SISN value where an MSS index will be inserted. In one embodiment an MSS mapping is a random value having three numbers, each number indicating a bit position within the SISN where a corresponding bit from the MSS index will be inserted. In one embodiment, where an SISN value contains 32 bits, each bit having a position from zero to 31, an MSS mapping may be represented as j.k.l, where j, k, and l are values from zero to 31 inclusive, corresponding to bit positions in the SISN. For example, an MSS mapping of 22.4.8 indicates that the first bit of the MSS index is to be placed in the $22^{nd}$ bit position, the second bit is to be placed in the $4^{th}$ position, and the third bit is to be placed in the $8^{th}$ position. Note that in this embodiment, the ordering of the values within an MSS mapping is significant, since the corresponding bit positions in the SISN value are not necessarily increasing.

At a block 608, the process 602 computes a second hash value, based on the first hash value and the current random number. At a block 610, the MSS index is combined with the second hash value, to produce an SISN value. For example, in one embodiment, where the SISN is a 32 bit value, and the MSS index is a 3 bit value, the second hash value is computed to be a 29 bit value. The three bits of the MSS index are inserted into the appropriate bit positions of the SISN, as indicated by the MSS mapping. The bits of the second hash value are inserted in the empty positions of the SISN, resulting in a 32 bit SISN value. The result is that the position of the MSS index within the SISN is randomly selected.

Upon receiving a SYN-ACK packet 506, the SAC 110 can extract the MSS index value and the CISN value, determine the original MSS value or a value that approximates it, and use these values in further TCP protocol communications with the client or the server.

Figure 7:
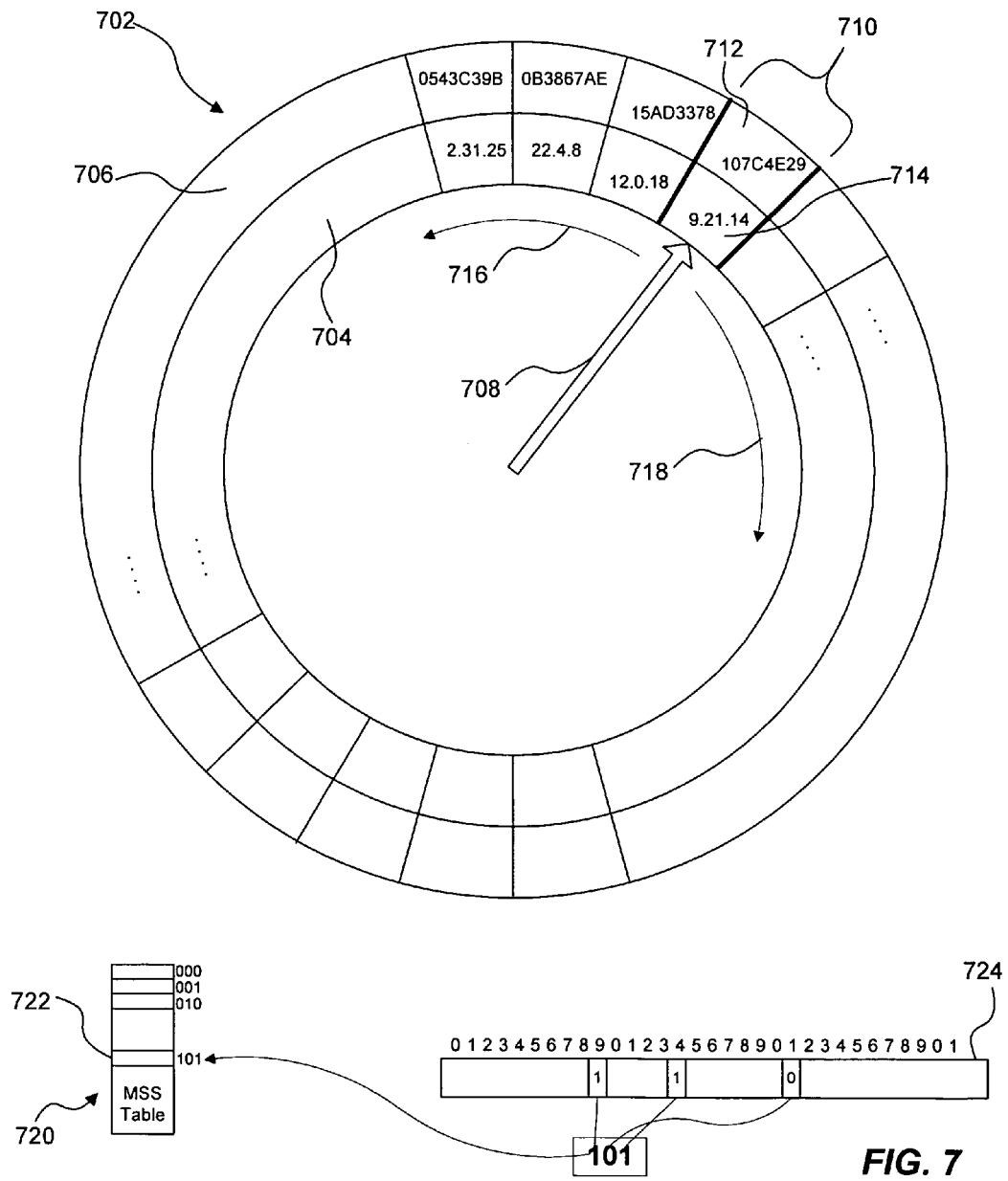
FIG. 7 illustrates a data structure for maintaining random seeds, in accordance with an embodiment of the present invention.

FIG. 7 illustrates a random seed—MSS mapping (RS-MSS) table 702 containing current and recent random numbers 706, and current and recent MSS mapping values 704. FIG. 7 illustrates a conceptual view of a data structure containing these values, where the random values and the MSS mappings are stored together in a single circular data structure, each entry having one random value and one MSS mapping value. A variety of data structures or combinations of data structures can be used to implement this conceptual table. Reference to the RS-MSS table includes reference to different types of structures and access algorithms for implementing such a table.

As illustrated in FIG. 7, a pointer 708 points to a current entry 710 for the RS-MSS table. The current entry is the one that has been most recently filled in with a random seed value and a randomly selected MSS mapping value. The arrow 716 points in the direction of recent entries; the further along this arrow from the pointer 708, the further back in time is the corresponding entry. In one embodiment, each entry is the current entry for 100 milliseconds. At the end of this time, a new random seed value and a new random MSS mapping value is determined, and placed in the oldest entry, overwriting the previous value that was there. The new random seed value and the new random MSS mapping value are randomly selected, resulting in a very low probability that any two consecutive entries have identical values, or that any two entries in the RS-MSS table have identical values. The pointer 708 is then moved to the new current entry, in the direction of the arrow 718. In this way, a circular list of entries is maintained. In one embodiment, the circular RS-MSS table contains 40 entries, each entry being current for 100 milliseconds, so that an entry is valid for four seconds before it is overwritten. Tables of different sizes and different times for changing current entries can be employed with the invention.

Figure 6:
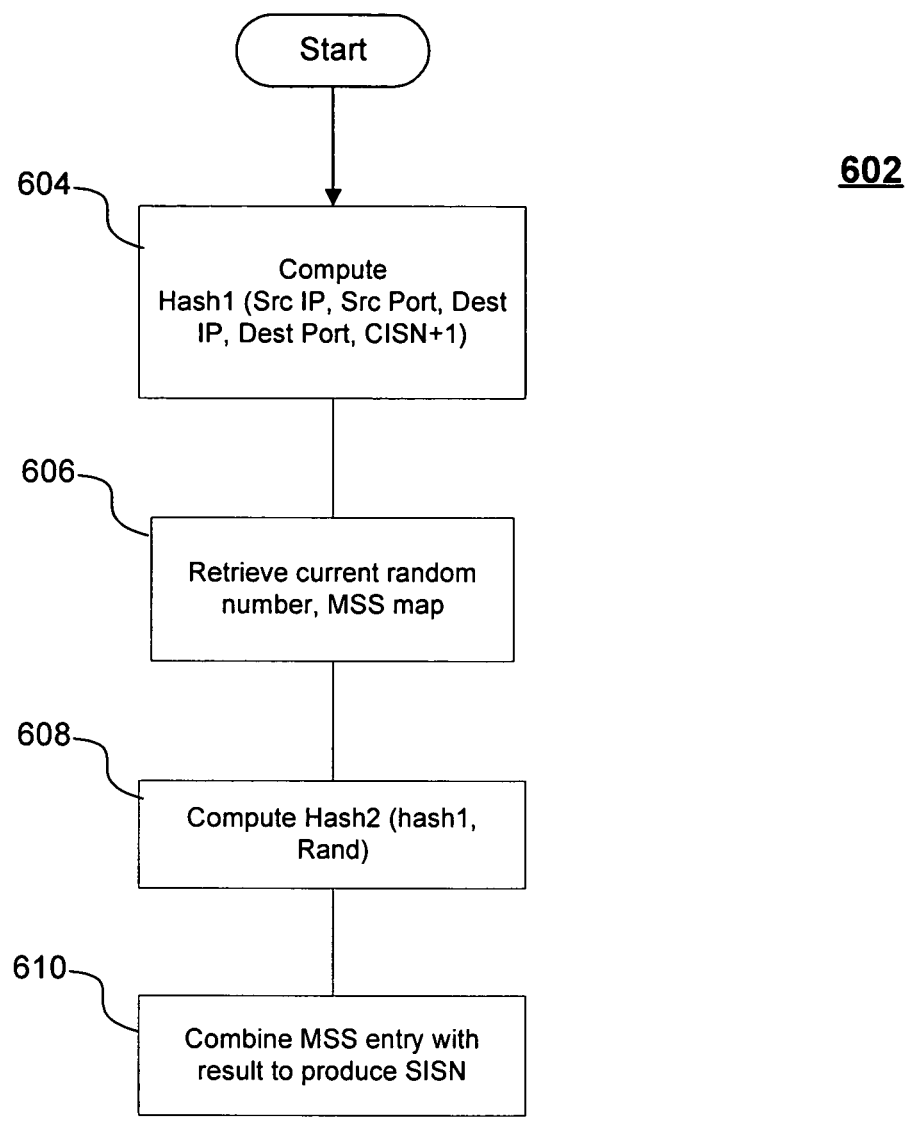
FIG. 6 is a flow chart illustrating a process for determining an initial sequence number, in accordance with an embodiment of the present invention.
Figure 8:
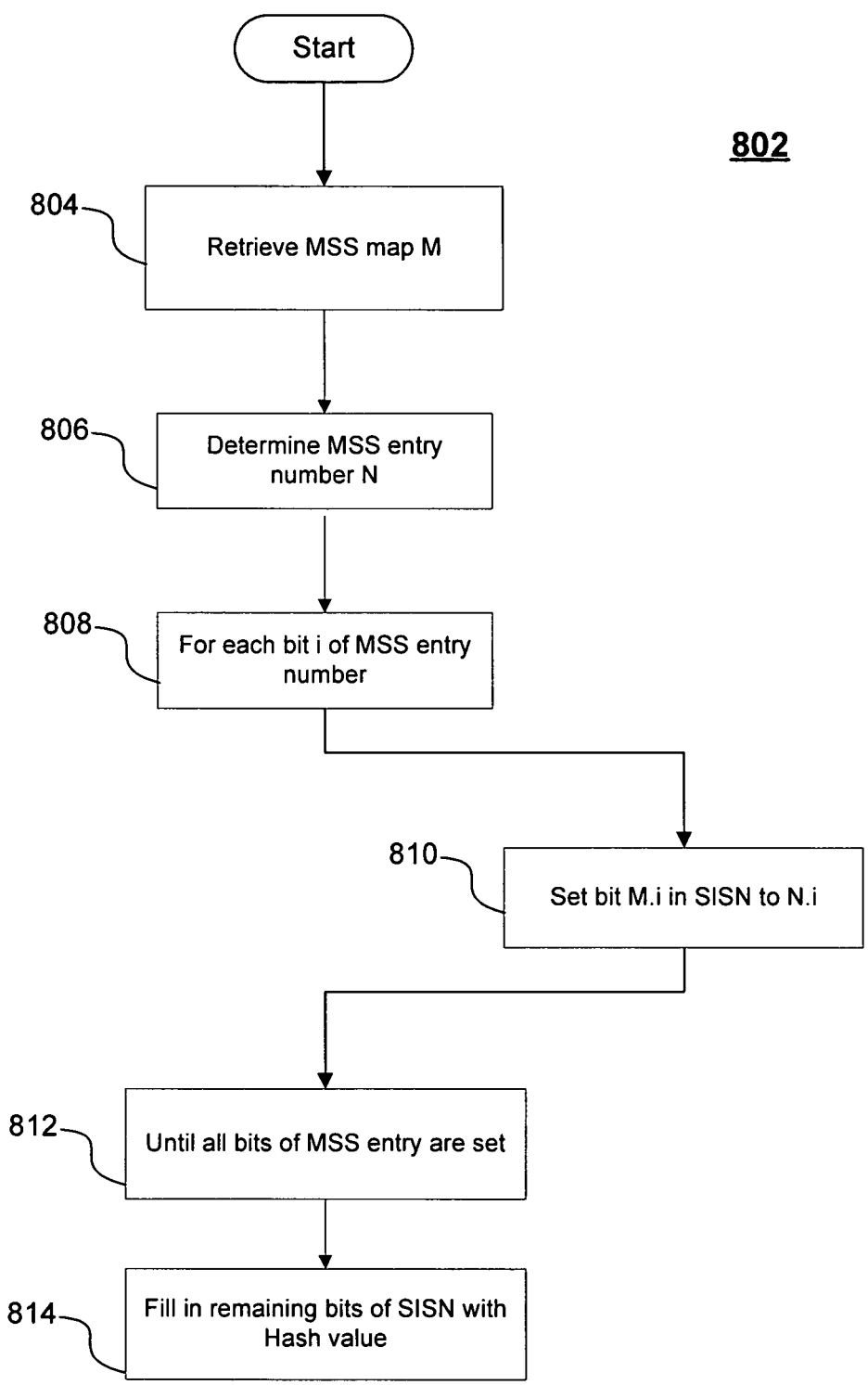
FIG. 8 is a flow chart illustrating a process for creating an initial sequence number, in accordance with an embodiment of the present invention.

FIG. 8 illustrates a process 802 of generating an SISN value, and shows in further detail the actions of blocks 606 and 610 of FIG. 6. In the discussion of the process 802, reference is made to FIG. 7. At a block 804, the process retrieves the current MSS map value, M from the RS-MSS table. Each number of the value M is referenced as M.i. At a block 806, an MSS index value N is determined, based on the MSS value received in the incoming SYN packet 504 (FIG. 5). Each bit of the value N is referenced as N.i.

At a block 808, a short loop of actions is performed, with one iteration for each number of the value M. During each iteration, at a block 810, a bit in the SISN value being generated corresponding to the number M.i is set with the corresponding bit N.i. The short loop terminates at the block 812 when all bits of the MSS index value have been inserted into the SISN value. At a block 814, the remaining bits of the SISN value are filled in with the hash value computed during the action of block 608 (FIG. 6).

As illustrated in FIG. 7, the current entry 710 includes a current random seed value 712 and a current MSS mapping value 714. The illustrated current MSS mapping value 714 is 9.21.14. As described above, an MSS mapping value of 9.21.14 indicates that the three bits of the MSS table index will be inserted in bits 9, 21, and 14 respectively, of an SISN that is being created. FIG. 7 further illustrates an example where an MSS table index of 101 (binary) is used to reference entry 101 (722) in an MSS table 720. An SISN value 724 having 32 bits is illustrated. The three bits "1", "0", and "1" are inserted into the SISN value at bit positions 9, 21, and 14, respectively, during the action of blocks 808-812. The remaining 29 bits of the SISN value 724 are filled with the 29 bits of the hash value computed during the action of block 814. As discussed in further detail below, this process is reversed to extract the hash value and determine the MSS value from an SISN that is received in a later packet.

As described above, in the process 802, the bit positions of the MSS table index in the SISN varies, and as a result, the combination of bits used to represent the hash value varies. More specifically, the bit positions are changed every time interval, and they are changed in a random manner. It is to be noted that one result of using the process 802 is that the entropy of the SISN value is not predictively reduced. The location of the bits containing the MSS index is not fixed, and is not easily determined by a party not having access to the RS-MSS table, even if the process 802 is known. Because the selection of which bits contain the hash value and which bits contain the MSS index is obscured, the difficulty of breaking the security of the system is increased.

Figure 9A:
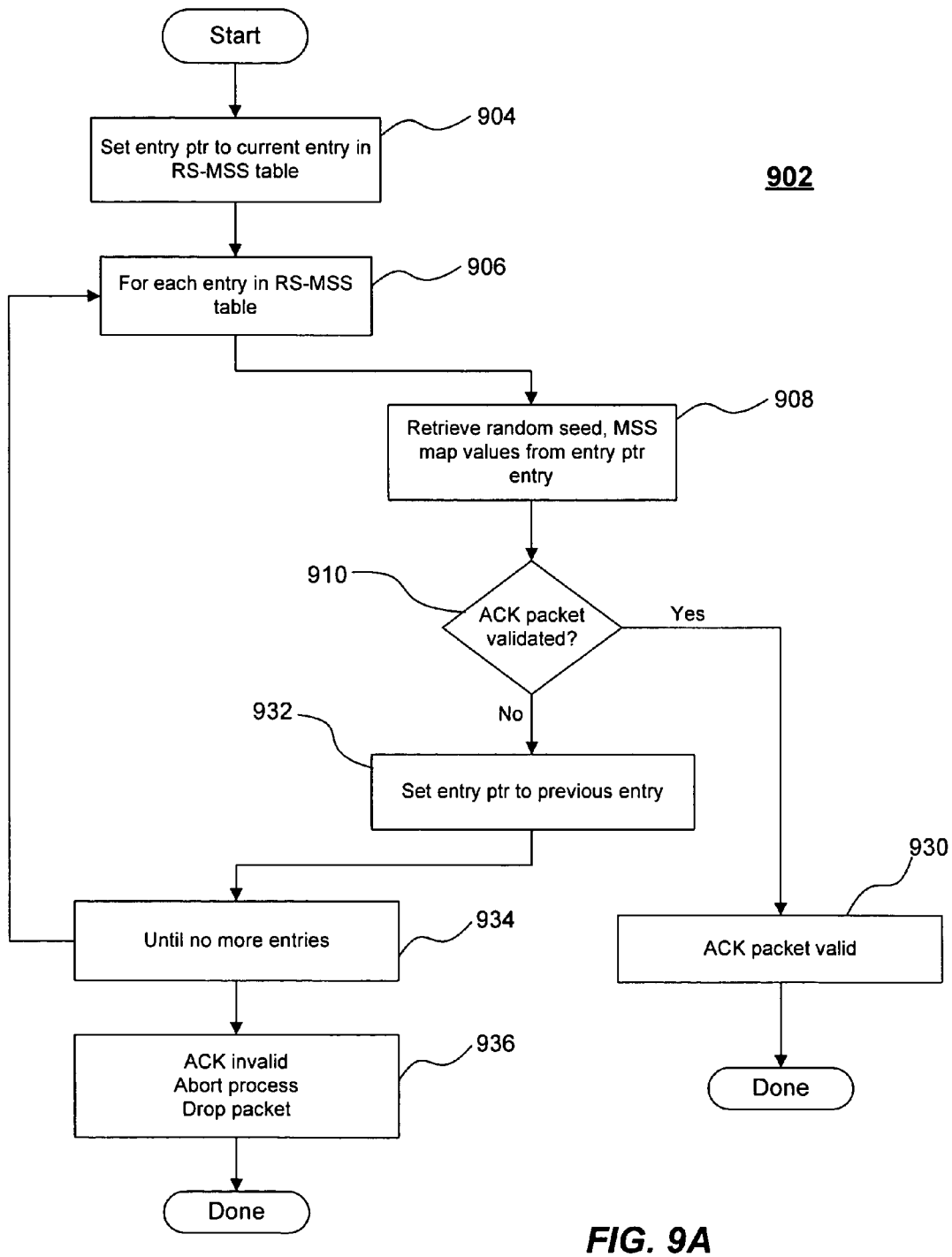
FIGS. 9A-B are flow charts illustrating a process for validating a packet, in accordance with an embodiment of the present invention.
Figure 9B:
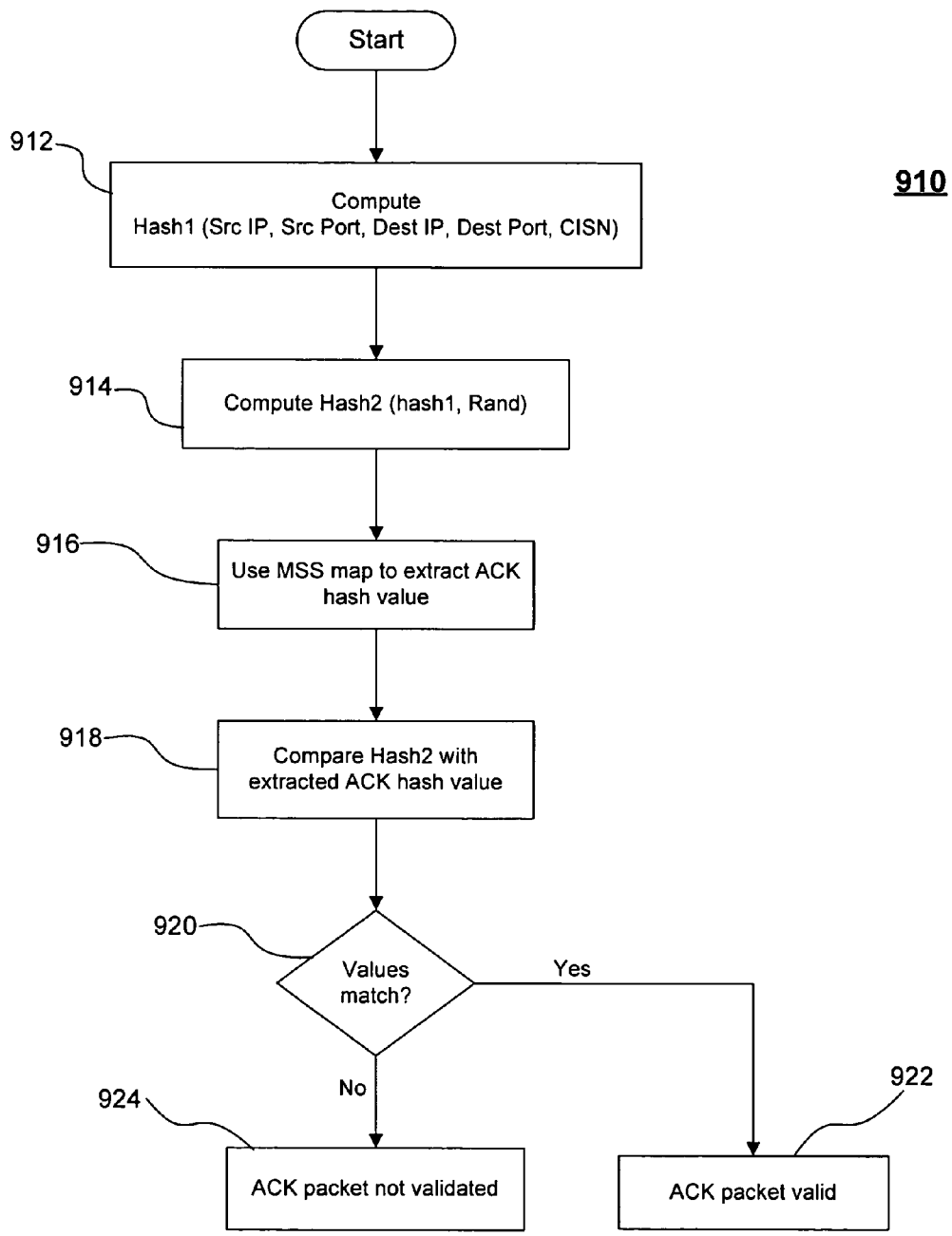

When a TCP server, such as the SAC 110 of FIG. 1, receives an ACK packet, such as ACK packet 508 (FIG. 5), the TCP server validates that the packet is a valid packet sent in response to a SYN-ACK packet 506 containing an SISN value generated as described above. The TCP server does this by following a process that is basically the reverse of the above process. FIGS. 9A-B illustrate a process 902 of validating an ACK packet.

The process 902 illustrated in FIGS. 9A-B is performed in response to receiving an ACK packet, such as ACK packet 508 from a client. At the time of receiving such a packet, the SAC does not know whether the packet is a valid ACK packet as part of a TCP handshake with the client, or whether it is an invalid packet sent in an attempt to disrupt the SAC or the network. Upon starting the process 902, at a block 904, an entry pointer is set to point to the current entry 710 in the RSS-MSS table 702 (FIG. 7). The entry pointer serves as an index pointer for stepping through the table within the process 902.

At a block 906, the process 902 begins a loop such that, unless the loop terminates early, an iteration of the loop is performed for each entry in the RSS-MSS table 702. At a block 908 within the loop, the random seed and the MSS map value within the entry pointed to by the entry pointer are retrieved. The first time through the loop, these values will be the current random seed 712 and the current MSS map value 714. At a decision block 910, a determination is made of whether the ACK packet can be validated using the retrieved random seed and MSS map value. Details of the decision block 910 are illustrated in FIG. 9B and discussed below.

If, at the decision block 910, a determination is made that the ACK packet is validated, the process breaks out of the loop and proceeds to a block 930, where the ACK packet is considered to be valid. At this point, the process 902 of validating the ACK packet is complete.

If, at the decision block 910, a determination is made that the ACK packet has not been validated based on the entry pointed to by the entry pointer, flow proceeds to a block 932, where the entry pointer is set to point to the previous entry in the RS-MSS table 702. As shown in the conceptual illustration of FIG. 7, the previous entry is the next entry moving in a counter-clockwise direction. As discussed above, each previous entry corresponds to a window of time.

At a block 934, if there are entries that have not been used to test for validation, flow proceeds back to the top of the loop, represented as the block 906, for another iteration of the loop. If, at the block 934, there are no more entries, the loop terminates. Flow proceeds to a block 936, where a determination is made that the ACK is invalid. The ACK packet is dropped, and the SYN cookie process is aborted.

FIG. 9B illustrates, in further detail, the determination of validating an ACK packet with respect to a single RS-MSS table entry, as represented by the decision block 910 of FIG. 9A. After starting, at a block 912, the process computes a first hash value of the combination of the source IP, source port, destination IP, destination port, and CISN values extracted from the ACK packet. At a block 914, the process computes a second hash value of the combination of the first hash value and the random seed corresponding to the current iteration of the loop of FIG. 9A. This is the random seed retrieved at the block 908.

At a block 916, the MSS map value corresponding to the current loop iteration (retrieved at the block 908) is used to extract an ACK hash value from the SISN of the ACK packet. In an implementation having an MSS index of three bits and an SISN of 32 bits, this extraction involves identifying the three bits corresponding to the MSS index, and extracting the remaining 29 bits as the ACK hash value. For example, in the illustration of FIG. 7, an MSS map value of 9.21.14 indicates that bits 9, 21, and 14 of the SISN are used for MSS index, and the remaining 29 bits indicate the ACK hash value.

At a block 918, the extracted ACK hash value is compared with the second hash value (computed in block 914). In a decision block 920, if the values match, flow proceeds to a block 922, where the ACK packet is considered to be valid. If, at the decision block 920, the hash values do not match, flow proceeds to a block 924, where the ACK packet is considered to not be validated with respect to the RS-MSS entry of the current loop iteration.

In the message flow illustrated in FIG. 5, the data packet 516 arrives at the SAC 110 after the handshake between the SAC and the server 112 is completed and a TCP connection is created. This allows the SAC to forward the data packet 516 as a layer 4 switch without buffering the packet. It is possible, however, that the SAC receives a data packet from the client 102 before the connection between the SAC and the server is established. One aspect of the invention describes a method of delaying the arrival of data packets from the client, or of handling the situation where a data packet arrives prior to the SAC to server TCP handshake completion.

Figure 10:
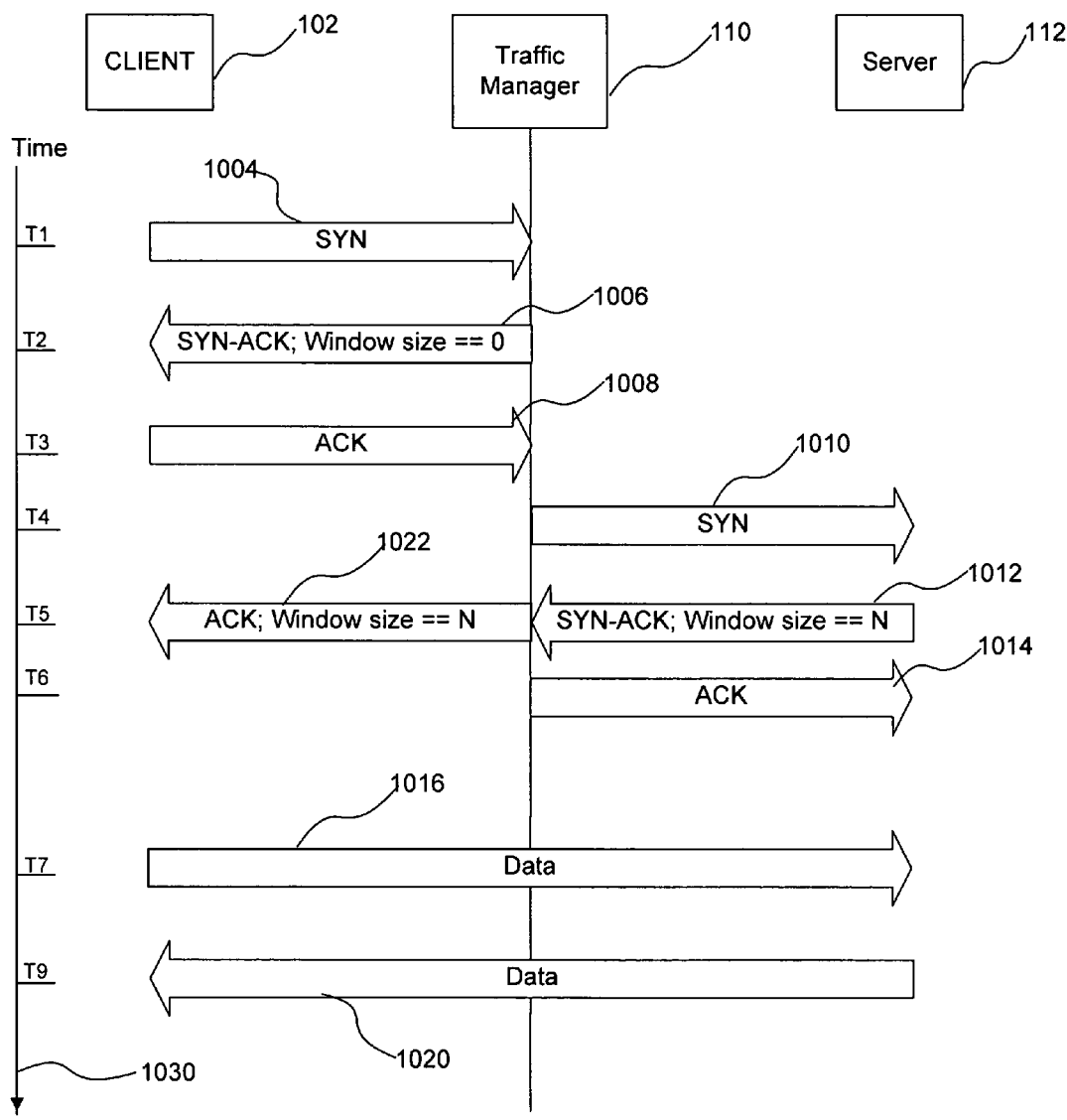
FIG. 10 illustrates another message flow combining layer 4 switching and layer 7 switching, in accordance with an embodiment of the present invention.

FIG. 10 illustrates a message flow in accordance with an aspect of the invention. FIG. 10 illustrates a communication between a client, such as client 102 of FIG. 1, and a server, such as server 112, employing an intermediate network device, such as server array controller 110. The flow of packets is illustrated with a timeline 1030, to show the sequence of events, though the units of time are not to scale and may vary.

As illustrated in FIG. 10, the client 102 initiates a TCP handshake by transmitting a SYN packet 1004. The server array controller (SAC) 110 receives the SYN packet, as discussed at block 406 (FIG. 4). In response, the SAC sends to the client a SYN-ACK packet 1006. A SYN-ACK packet includes a field for specifying an initial window size. The window size specifies the maximum amount of data that a packet receiver is currently willing to receive. The window size field is described in RFC 793, cited above. In one embodiment of the invention, the SAC sets the window size in the SYN-ACK packet 1006 to be zero or a value substantially close to zero so as to prevent the client from sending data packets. This has the effect of instructing the client to not send data packets. As used herein, the term "zero window size" refers to a specification of exactly zero or a number substantially close to zero so as to bring about the desired effect of delaying packet transmission.

The client then responds by sending an ACK packet 1008. This completes the TCP handshake between the SAC and the client. The SAC then performs a TCP handshake with the server. The SAC sends a SYN packet 1010, the server responds with a SYN-ACK packet 1012, and the server responds to the server with an ACK packet 1014, similar to the handshake described in FIG. 5 and related text.

As illustrated in FIG. 10, when the SAC 110 receives the SYN-ACK packet 1012 from the server, the SAC modifies the packet by clearing the SYN bit, forwards this modified packet to the client, as ACK packet 1022. The SYN-ACK packet 1012 sent by the server includes a window size that is desired by the server. The SAC allows the value for the window size to remain unchanged in the modified ACK packet 1022. This has the effect of instructing the client that it can send data packets up to the specified window size. The client, upon receiving the ACK packet 1022 can begin sending data packets. The SAC, immediately upon sending the ACK packet 1022, sends the ACK packet 1014 to the server to complete the TCP handshake. In this way, the SAC will complete the sending of the ACK packet 1022 before processing an incoming data packet from the client.

The client can now begin sending data packets, such as data packet 1016 to the SAC, which performs layer 4 switching and forwards the packets to the server. The server can send data packets, such as data packet 1020 to the SAC, which performs layer 4 switching dns forwards these packets to the client. The message flow 1002 therefore allows efficient communications between the client and the server, through the SAC.

Figure 11:
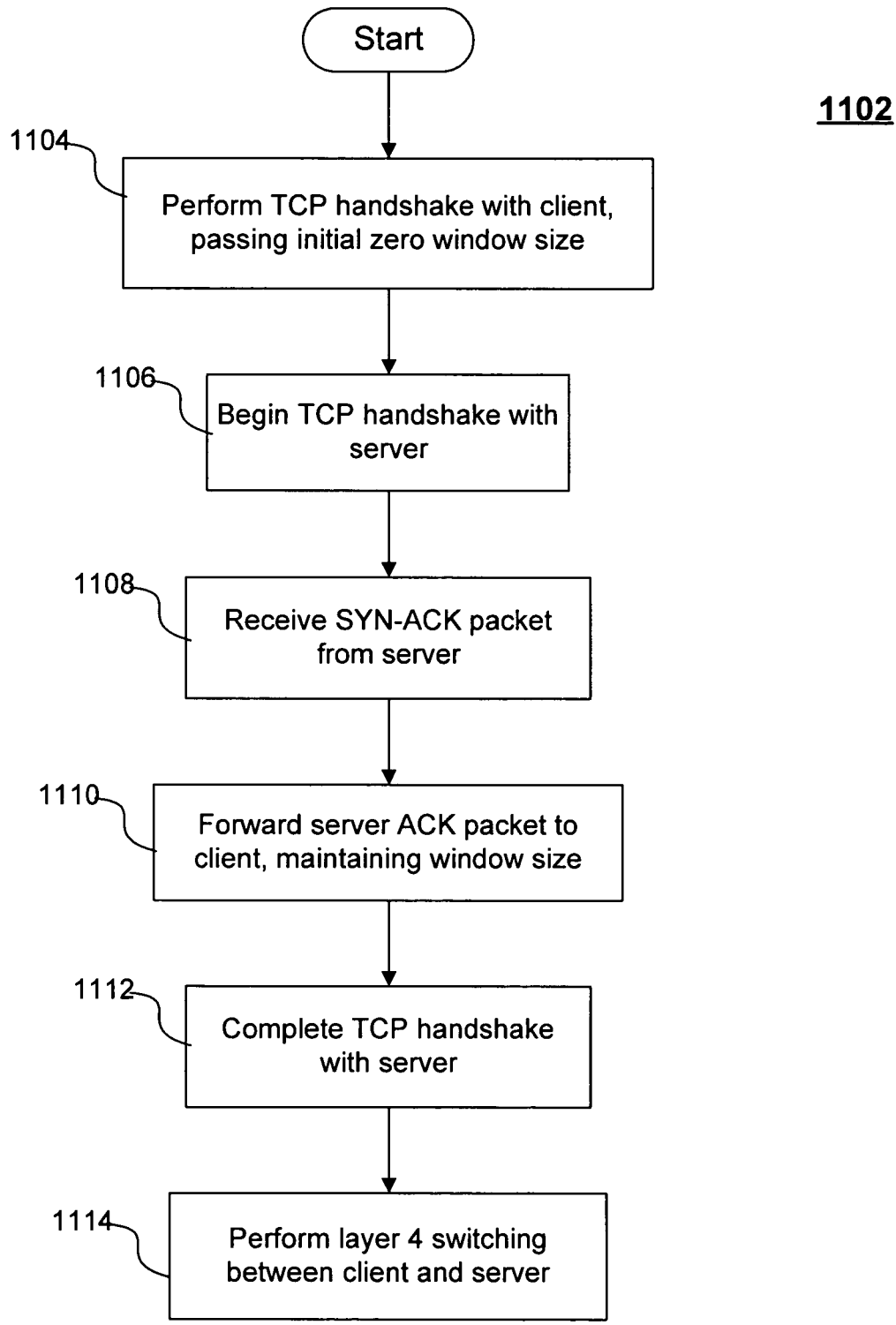
FIG. 11 is a flow chart illustrating a process for performing switching between a client and a server, in accordance with an embodiment of the present invention.

FIG. 11 is a flow chart illustrating a process 1102 for using a zero-window size to pause communications from a client, as described above. After a start, at a block 1104, the SAC 110 performs a TCP handshake with the client 102, passing an initial window size of zero. At a block 1106, the SAC begins a TCP handshake with the server 112. At a block 1108, the SAC receives a SYN-ACK packet from the server, the packet including a specified window size. At a block 1110, the SAC modifies the SYN-ACK packet to be an ACK packet, and forwards the modified packet to the client, maintaining the specified window size.

At a block 1112, the SAC completes the TCP handshake with the server. After completing the TCP handshake with the server, at a block 1114, the SAC performs layer 4 switching between the client and the server.

Figure 12:
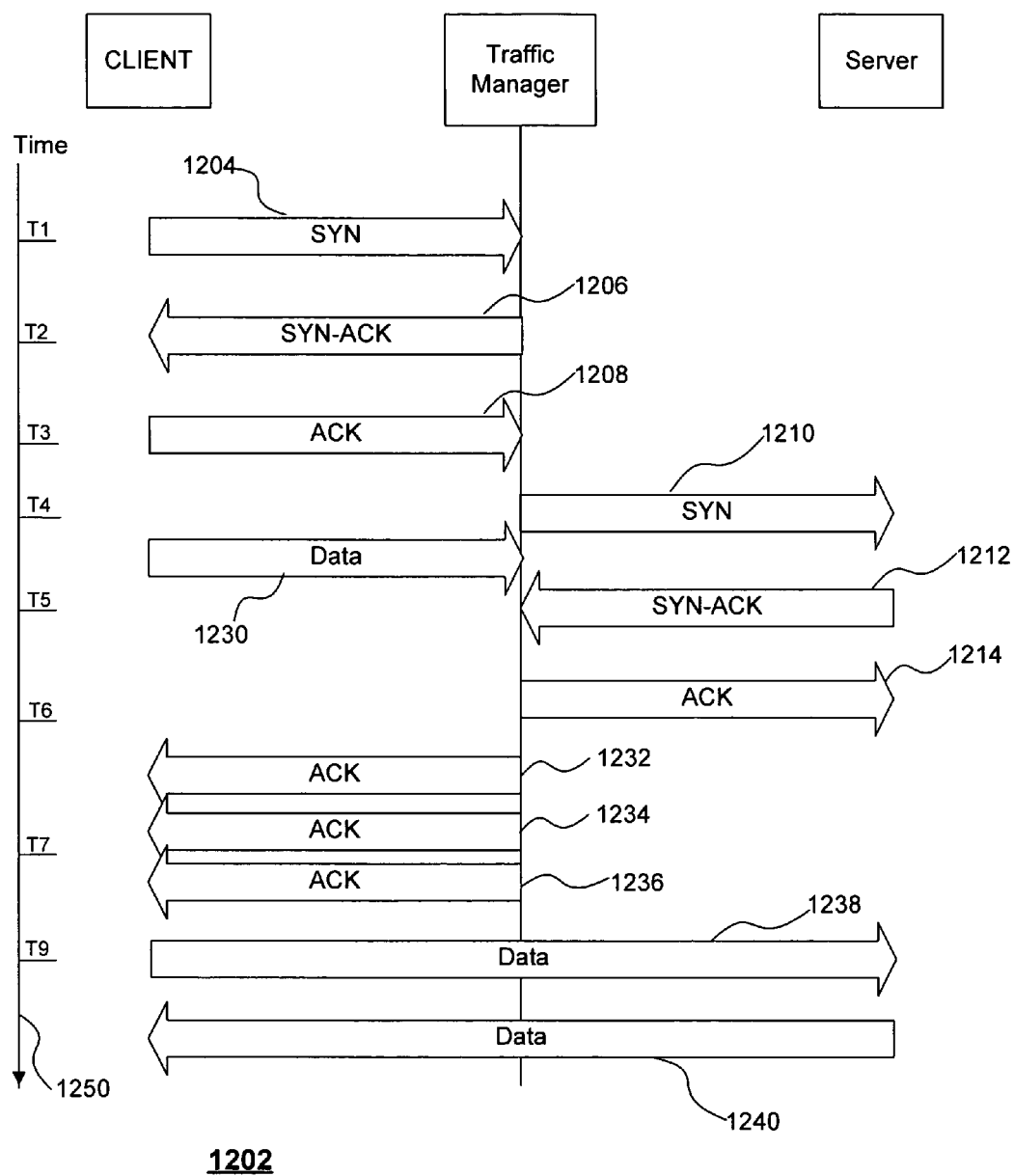
FIG. 12 illustrates a message flow combining layer 4 switching and layer 7 switching, in accordance with an embodiment of the present invention.

FIG. 12 illustrates a message flow in accordance with an aspect of the invention. FIG. 12 illustrates a communication between a client, such as client 102 of FIG. 1, and a server, such as server 112, employing an intermediate network device, such as server array controller 110. The flow of packets is illustrated with a timeline 1250, to show the sequence of events, though the units of time are not to scale and may vary.

As illustrated in FIG. 12, the client 102 initiates a TCP handshake by transmitting a SYN packet 1204. The server array controller (SAC) 110 receives the SYN packet, as discussed at block 406 (FIG. 4). In response, the SAC sends to the client a SYN-ACK packet 1206. Unlike the message flow of FIG. 10, the SYN-ACK packet 1206 can be a standard initial window size.

The client then responds by sending an ACK packet 1208. This completes the TCP handshake between the SAC and the client. The SAC then performs a TCP handshake with the server. The SAC sends a SYN packet 1210, the server responds with a SYN-ACK packet 1212, and the server responds to the server with an ACK packet 1214, similar to the handshake described in FIG. 5 and related text.

In the event that the client sends a data packet, such as data packet 1230, to the SAC prior to completion of the SAC-server TCP handshake completion, the SAC drops the data packet 1230. It does not store or forward this data packet. According to the TCP protocol, when the client does not receive an acknowledgement of the data packet 1230 after a specified period of time, the client retransmits the data packet. In order to reduce the time that the client waits before resending the data packet, when the SAC has completed the TCP handshake with the server, the SAC transmits three ACK packets 1232-1236 to the client in rapid succession. This procedure is done according to the TCP fast retransmit protocol, described in RFC 2001, available at http://www.faqs.org/rfcs/rfc2001.html. The receipt of three successive ACK packets functions as a signal to the client to resend the data packet 1230 for which it received no acknowledgement.

Upon receiving this signal, the client resends the data packet 1230. The resent packet is shown as data packet 1238. The SAC performs layer 4 switching on this packet, forwarding it to the server. The SAC continues performing layer 4 switching with additional data packets, such as data packet 1240 sent from the server.

The variation of the invention illustrated in FIG. 12 and described above improves the communication between the client and the server.

Figure 13:
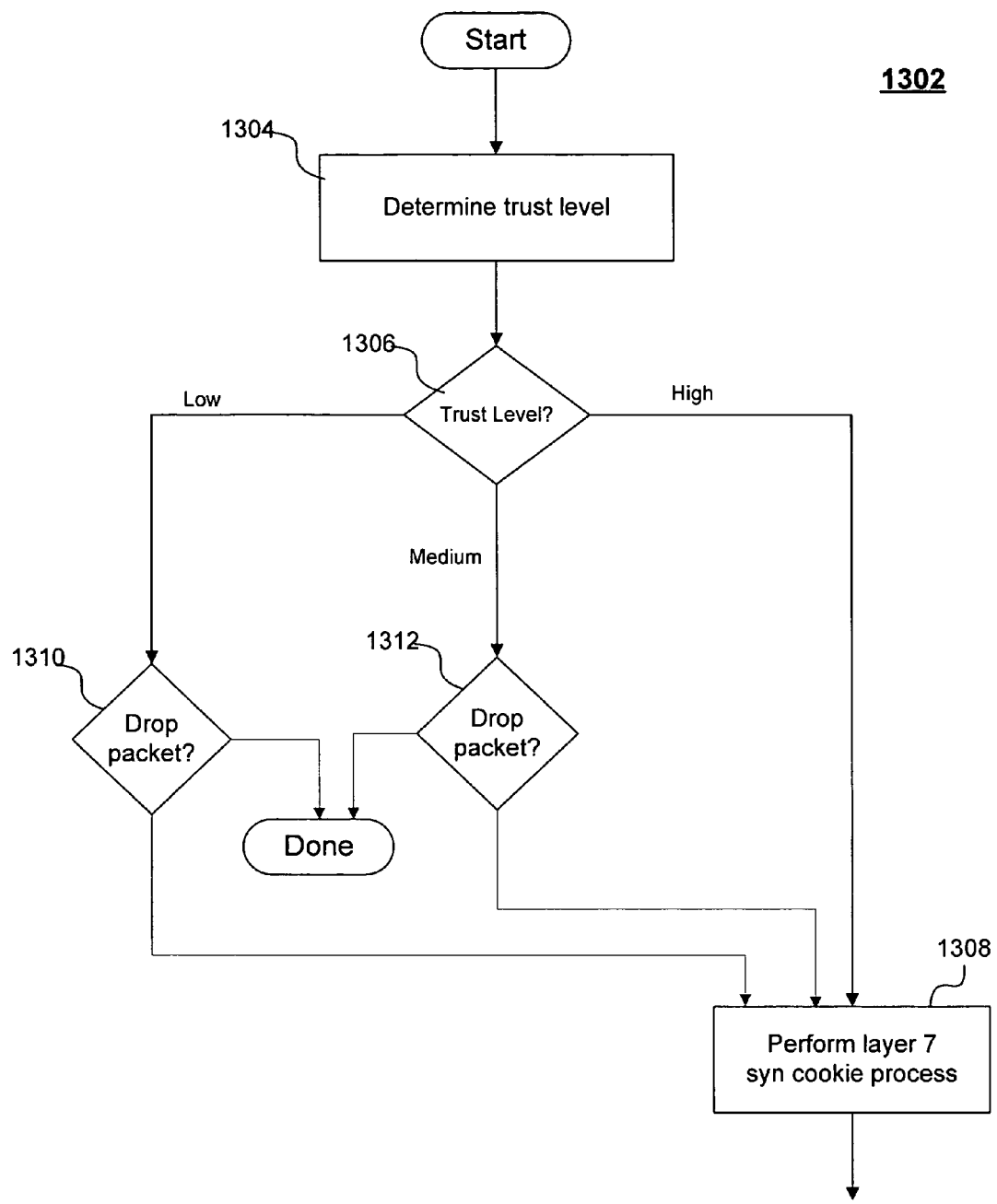
FIG. 13 illustrates an aspect of the invention involving levels of trust that can be employed in some embodiments of the invention.

FIG. 13 illustrates an aspect of the invention that can be employed in some embodiments of the invention. The process 1302 illustrated in FIG. 13 can fit into the process 402 of FIG. 4 by beginning prior to action of the block 412 of performing a layer 7 Syn cookie process. As illustrated in FIG. 13, at a block 1304, the process determines a trust level corresponding to the incoming packet. A trust level can be based on the source of the packet, as indicated by the source field. Techniques for determining a trust level are discussed below. A trust level can be represented in a number of ways. As illustrated in FIG. 13, three levels of trust—low, medium, and high, are employed. The process can also be performed with two levels, or any number of levels greater than two. The trust level can also be represented by a value, rather than a discrete number, so that an infinite number of levels are represented.

At a decision block 1306, a determination is made of the trust level corresponding to the packet. After the block 1306, process flow proceeds based on the trust level. If the trust level is high, flow proceeds to a block 1308, where a Syn cookie process begins. This can be the action of the block 412 of FIG. 4. Flow can then continue as in the process 402 of FIG. 4.

If the trust level is low at the block 1306, process flow proceeds to a block 1310. At the block 1310, a determination is made as to whether to drop the packet. This determination can be made in a random manner to drop a certain percentage of packets at this level. For example, the process might drop 10% of such packets, and allow 90% of the packets to continue to the block 1308, where the Syn cookie process begins.

If the problem of flooding decreases, the percentage of dropped packets could be lowered. If the problem increases, the percentage of dropped packets could be increased. If a legitimate packet is dropped, the TCP protocol will cause the sender to resend the packet, so the connection can still be continued.

A block 1312 indicates an action for packets at a medium level of trust. This is similar to the block 1310, except that a lower percentage can be used for dropping packets. For example, if 10% of low trust packets are dropped, 5% of medium trust packets can be dropped. As discussed for the low trust packets, the percentage number can be modified based on changes in the flooding and the available resources.

In one embodiment, a a value representing a trust level is determined, and the number of packets to drop is determined based on the trust level value, such that the lower the level of trust, the higher the probability of dropping the packet.

In one embodiment, the trust level of packets is determined based on the source network block address corresponding to the packet, and the recent history of network traffic from that network block. For example, network blocks having a relatively high number of completed connections can be categorized as high trust. Network blocks that have not had much recent traffic can be categorized as medium trust. Network blocks that have a high number of incomplete connections can be categorized as low trust. The SAC can maintain data indicating the number of complete or incomplete connections for each network block. Alternatively, the SAC can maintain data on completed connections, but not for incomplete connections, and the make categorizations based on the number of complete connections. Complete source addresses can also be used in determining whether to drop a packet. In one embodiment, the SAC can be configured with addresses that are to be considered, at least initially, as having a high level of trust. These addresses are reclassified as lower levels of trust if a high number of incomplete connections with these addresses is observed. By doing this, a higher trust can be given to known sources, but also accommodate situations where the trusted source addresses are improperly used, as in spoofing, or for other reasons that cause the addresses to be less trusted.

It should therefore be understood by the above description, that aspects of the invention can result in incoming packets either being processed to initiate a TCP connection, to initiate a Syn cookie procedure, or to be dropped. This can be done on one or more of several factors, including whether one or more resource thresholds have been reached, whether a signal has been received from a network device, and the source address of the packet.

In some embodiments of the invention, various aspects and methods of the invention are performed by a server, such as one of servers 112-116 of FIG. 1. In these embodiments, there can be, but is not necessarily, a SAC. For example, a server may implement one or a combination of the aspects described of maintaining an RS-MSS table 702, using the RS-MSS table to generate SISN values as illustrated in FIGS. 6 and 8, validating a packet as illustrated in FIGS. 9A-B. These and other aspects of the invention may be practiced by other network devices that support network protocols such as TCP.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method for managing a communication between at least one client and an array of at least one server on a network, comprising:

employing layer four switching to receive from a client device a synchronization (SYN) packet requesting an initiation of a communication connection, the initiation being used in performing a first protocol handshake with a first client device that is the client device;

when it is determined that a resource threshold is exceeded, then changing to use layer seven processing to perform actions, including:

sending a synchronization-acknowledgement (SYN-ACK) to the client device, the SYN-ACK including a server initial sequence number (SISN) that has embedded within it a maximum segment size (MSS) index to an MSS value in an MSS table, wherein each bit location of the MSS index in the SISN is determined by a periodically changing MSS mapping value, and wherein remaining bits in the SISN are based on a seed value that corresponds to the MSS mapping value;

determining that an ACK received from the client device is valid when a hash value that is based on the seed value matches an ACK hash value that is extracted from the SISN in the ACK based on the MSS mapping value;

in response to receiving a valid ACK from the client device, performing at level seven processing a connection initiation with the at least one server that is used in performing a second protocol handshake with a target server that is the at least one server, to initiate establishing connections with the client device and the at least one server; and when the establishment of the connection is initiated at layer seven, transitioning from layer seven processing to layer four processing to communicate data packets used for at least a connection initiate handshake protocol and a connection terminate handshake protocol, or other data packets used for more than just establishing connections between the client device and the at least one server using the established connections, wherein layer four and seven are layers within the Open Systems Interconnection (OSI) protocol stack.

2. The method of claim 1, wherein the method operates within a network device operating as a server array controller between the at least one client and the array of at least one server.

3. The method of claim 1, wherein the receiving the valid ACK from the client device further comprises retrieving from the SISN the MSS index.

4. The method of claim 1, further comprising when it is determined that the resource threshold is exceed:

(a) instructing the client device to delay sending data at least until the ACK from the client device is validated.

5. In an intermediate network device, a method for managing a communication between a client and a server on a network, comprising:

employing layer four switching to receive from a client device a synchronization (SYN) packet requesting an initiation of a communication connection that is used in performing a first protocol handshake with the client device;

when it is determined that a resource threshold is exceeded, then changing to use layer seven processing to perform actions, including:
  sending a synchronization-acknowledgement (SYN-ACK) to the client device, the SYN-ACK including a server initial sequence number (SISN) that has embedded within it a maximum segment size (MSS) index to an MSS value in an MSS table, wherein each bit location of the MSS index in the SISN is determined by a periodically changing MSS mapping value, and wherein remaining bits in the SISN are based on a seed value that corresponds to the MSS mapping value;
  determining that an ACK received from the client device is valid when a hash value that is based on the seed value matches an ACK hash value that is extracted from the SISN in the ACK based on the MSS mapping value;
  in response to receiving a valid ACK from the client device, performing at level seven processing a connection initiation with the at least one server, to initiate establishing connections with the client device and the at least one server that is used to perform a second protocol handshake with the at least one server that is a target server; and
when the establishment of the connection is initiated at layer seven, transitioning from layer seven processing to layer four processing to communicate data packets used for a connection initiate handshake protocol and a connection terminate handshake protocol, or other data packets used for more than just establishing connections between the client device and the at least one server using the established connections, wherein layer four and seven are layers within the Open Systems Interconnection (OSI) protocol stack.

6. An apparatus for managing a communication between a client and a server on a network, comprising:
  a network interface unit that receives and sends communications; and
  a processing component that performs actions, including:
    employing layer four switching to receive from a client device a synchronization (SYN) packet requesting an initiation of a communication connection that is used in performing a first level protocol handshake with the client device;
    when it is determined that a resource threshold is exceeded, then changing to use layer seven processing to perform actions, including:
      sending a synchronization-acknowledgement (SYN-ACK) to the client device, the SYN-ACK including a server initial sequence number (SISN) that has embedded within it a maximum segment size (MSS) index to an MSS value in an MSS table, wherein each bit location of the MSS index in the SISN is determined by a periodically changing MSS mapping value, and wherein remaining bits in the SISN are based on a seed value that corresponds to the MSS mapping value;
      determining that an ACK received from the client device is valid when a hash value that is based on the seed value matches an ACK hash value that is extracted from the SISN in the ACK based on the MSS mapping value;
      in response to receiving a valid ACK from the client device, performing at level seven processing a connection initiation with the at least one server that is used in performing a second protocol handshake with a target server that is the at least one server, to initiate establishing connections with the client device and the at least one server; and
    when the establishment of the connection is initiated at layer seven, transitioning from layer seven processing to layer four processing to communicate data packets used for a connection initiate handshake protocol and a connection terminate handshake protocol, or other data packets used for more than just establishing connections between the client device and the at least one server using the established connections, wherein layer four and seven are layers within the Open Systems Interconnection (OSI) protocol stack.

\* \* \* \* \*